Figure 1:
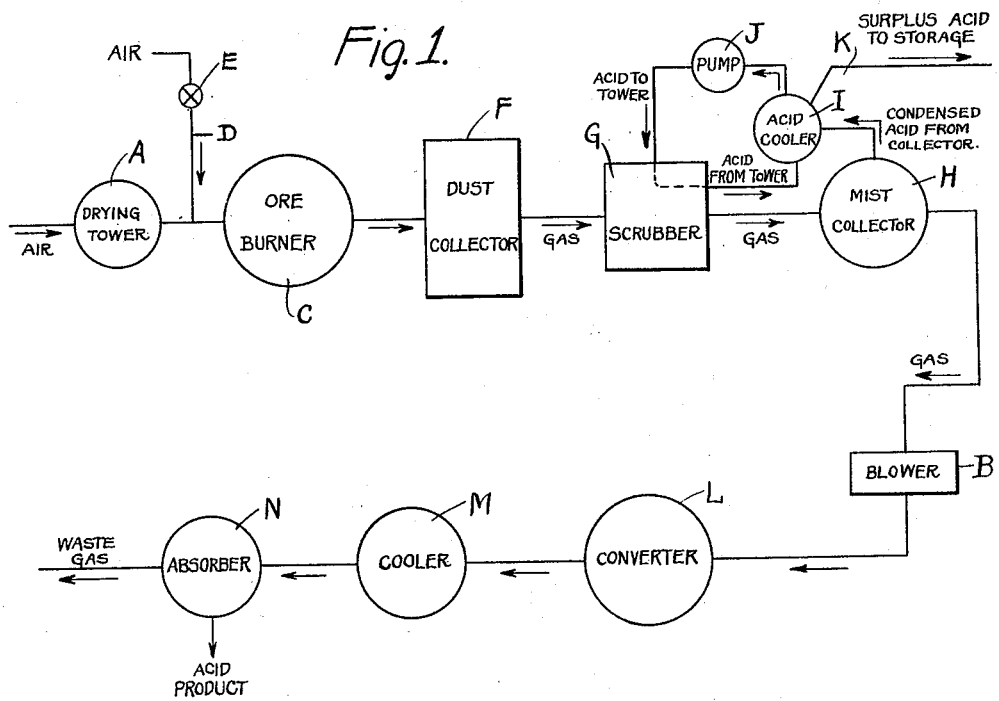

Oct. 11, 1932. C. B. CLARK 1,882,208
SULPHURIC ACID
Filed July 9, 1929

Inventor
CYRIL B. CLARK
By His Attorney

Patented Oct. 11, 1932

1,882,208

UNITED STATES PATENT OFFICE

CYRIL B. CLARK, OF SCARSDALE, NEW YORK, ASSIGNOR TO CATALYTIC PROCESS CORPORATION, OF NEW YORK, N. Y., A CORPORATION OF DELAWARE

SULPHURIC ACID

Application filed July 9, 1929. Serial No. 376,930.

My invention relates more particularly to improved methods for the production of sulphuric acid and sulphur trioxide by the contact sulphuric acid process in which the catalyst employed is not poisoned by the ordinary gaseous poisons, such as arsenic, hydrochloric acid, chlorine, selenium etc. arising from burning or roasting a sulphur containing material as pyrite to produce sulphur dioxide. As an example of the type of catalyst preferably used in my methods, I refer to the forms of vanadium catalysts described in the two U. S. patents to Jaeger No. 1,675,308 of June 26, 1928 and No. 1,694,123 of December 4, 1928.

When using platinum or other catalysts that are poisoned and rendered inactive by gaseous impurities, it is necessary to remove from the burner gases not only the solid particles but also any liquid particles and gaseous poisons if such are present. When an arsenical iron sulphide ore is used as a raw material, such a plant will use for purifying the gas the following equipment: dust collectors, scrubbers, coolers and mist removers. To remove gaseous impurities such as arsenic the gas should be cooled to about atmospheric temperature and then the cooled gas is washed with water, weak acid or alkaline solutions.

The use of vanadium catalysts eliminates several of the disadvantages, such as scrubbing with water, weak acid or alkaline solutions which necessarily introduces a large amount of water into the gas with the disadvantageous result that the gas is saturated with water vapor as it leaves the purification system. Such undesired moisture should be removed by drying the gas with sulphuric acid before entering the converter to prevent condensation of acid and corrosion of equipment beyond the converters. During warm humid weather the amount of water entering the drying system is often so great as to restrict to a large extent the amount of strong sulphuric acid or oleum produced.

A further objection is that the heated gas from the burners cannot be handled in iron equipment below the condensation point of sulphuric acid due to corrosion from the weak acid that will be condensed from the gas. A still further objection to the present purification system lies in the fluctuating amount of water introduced varying from 0.20 of a pound or less of water vapor per 1000 cubic feet of gas in winter to 1.75 pounds or more in summer. Such water combines with the $SO_3$ formed in the burners and gives a condensed acid in the purification equipment of varying strength. With low moisture entering the burner the acid condensed will be relatively strong, while with high moisture the acid is relatively weak.

I have discovered new and simplified and economical methods of purifying the gas in the system using a difficultly-poisoned catalyst such as vanadium catalysts in which no water is introduced into the purification system except the water vapor carried by the air to produce the burner gas.

Furthermore by my improved purification methods I control the amount of moisture entering the system by partly drying the air thereby exerting an exact and predetermined control of the strength of the acid condensed in the purification system. This feature is a distinct advantage in that strong acid can be produced of a definite strength which will permit the use of iron equipment throughout the purification system.

Again the strength of the condensed acid in the improved purification system is so regulated that such strength has a low aqueous vapor pressure which maintains the gas in a dry condition thereby avoiding further drying before the gas passes to the converters.

Figure 2:
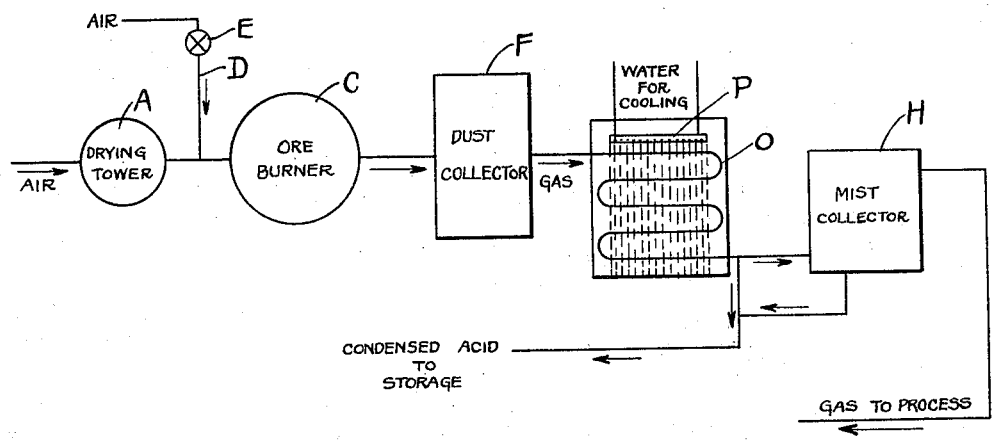

Of the drawing, Fig. 1 is a diagrammatic illustration of the apparatus in which the various major steps of the process are carried out through the converter, cooler and absorber;

Fig. 2 is a similar lay-out of the first steps of the process showing an alternative method of cooling the gas and condensing the acid when a relatively small amount of dust and fume remains in the gas following the dust collector.

Similar letters of reference indicate the same parts in both figures.

Referring to Fig. 1, part of the air enters the drying tower A by suction from the blower B, the tower A containing strong sulphuric acid by which the air entering the tower A is dried. Between the drying tower A and the ore burner C a controlled amount of undried or atmospheric air is introduced into the system through the flue connection D in which is located the control valve or damper E. According to my improved procedure the ratio of dried to undried or atmospheric air is varied to give a definite amount of moisture entering the burner C, and varies according to atmospheric conditions, the amount of sulphur trioxide produced in the burner C, and the strength of the acid to be condensed out of the purification system.

Changes in humidity of the air, the amount of $SO_3$ formed in the burner C, or the temperature to which the gases are cooled, all of which might change the strength of the condensed acid can readily be provided for by altering the ratio of dried to undried air entering the burner C by shifting the damper E in the undried air flue D. This is due to the fact that with a constant amount of moisture entering the burner C coupled with a constant formation of $SO_3$ therein, a constant strength of acid can be condensed in the purification equipment.

After leaving the burner C the gas enters the dust collector F where most of the dust present in the gas is removed. Such gas, however, may still contain some fine dust and various impurities such as arsenic, lead or zinc compounds in the form of fine fume, or in such a state that they will condense as the gas is cooled. The gas then passes through the scrubber G and mist collector H.

In this Fig. 1 apparatus the acid condensed in the scrubber G and mist collector H is circulated over the scrubber G and the amount of acid withdrawn from the system is substantially equal in amount to the acid condensed. The hot acid from the scrubber G is cooled in the acid cooler I and the solid impurities removed by settling before the acid is returned through the pump J to the scrubber G. Through pipe K from the cooler I all surplus acid is withdrawn to storage. By varying the amount of acid circulated and its cooling in the cooler I the temperature of the gas and removal of dust and fume therefrom can be regulated to suit the requirements.

I have discovered that when a relatively large amount of dust and fume is present in the gas under ordinary operating conditions, a considerable amount of such fume will pass the scrubber G which is difficult to remove from the gas unless special controlled conditions exist.

I have found that with acid of strength of about 92% only part of the sulphur trioxide from the burner C will be absorbed with the remainder of the $SO_3$ forming an acid mist with the water vapor in the gas or acid. This mist consisting of relatively coarse particles forms on the fume particles escaping through the scrubber G enlarges their size thereby assisting their removal in the mist collector H. Preferably the drying of the air entering the burner C is so regulated that an acid of about 92% strength will be condensed in scrubber G and mist collector H and a temperature of about 167° F.

The gas leaving the mist collector H is now sufficiently dry and free from impurities as to require no further treatment before passing through the blower B to the converter L. Up to the blower the gas has been drawn through the system by suction, but thereafter the gas is forced by pressure through the converter L and through the rest of the system. This converter L may be of the Selden type in which the heat generated in the converter is used to preheat the gas to a suitable temperature for starting conversion. Any other type of converter system may be used if desired. In the Selden converter the gas will pass at about 750° F. to the cooler M which may be of any well-known type. The cooled $SO_3$ gas then passes to the absorber N where the sulphur trioxide is removed by absorption in strong sulphuric acid. Water or weak acid is added to the absorber N in amount sufficient to form the desired strength of acid product withdrawn from the absorber while waste gas is removed therefrom.

Referring to Fig. 2, I have shown an alternative method of cooling the gas and condensing the acid when a relatively small amount of dust and fume remains in the gas following the dust collector F. In this method shown in Fig. 2 the scrubber G may be dispensed with and the iron tubes O cooled by water sprays P may be substituted. The gas passes through tubes O and is there cooled out of contact with water under such conditions that the acid will condense on the dust and fume particles assisting in their condensation and removal as hereinbefore described. The condensed acid is removed from the cooling tubes O and mist collector H to storage while the dry gas leaves the collector H to the converter L as in Fig. 1.

By either method of cooling an acid of about 92% strength will be condensed if the gas is cooled to about 167° F., and the gas is practically dry as it is sucked out of the mist collecter H. The strength of the acid may be tested in any suitable way. If the condensed acid is stronger than 92%, the damper E can be opened to allow more undried air to enter the system through the flue F; if the acid strength is below 92% this damper can be partly closed. Such shifting of the damper E provides an easy method of control for the strength of the acid condensed out of the system before conversion.

An example of the operation of my improved methods is as follows, it being understood that such example is merely indicative of certain procedures for carrying out the principles of the invention without being limited to the exact details set forth.

When using iron pyrites ore of the 5% of the sulphur in the burner C oxidized to sulphur trioxide ($SO_3$), the method of operation is substantially as follows:—

If the air used has a relative humidity of 70% at 70° F. I dry in the tower A about 70% of the air used for introduction in the burner C. If the air has a relative humidity of 30% at 70° F., I dry about 28% of the air used. The amount of air so dried in the tower A is regulated by the shifting of the damper E as hereinbefore described.

Under these conditions the amount of moisture entering the burner C will be about 0.277 lbs. per 1000 cu. ft. of 7% sulphur dioxide ($SO_2$) gas figured to standard conditions. In the burner C 0.837 lbs. of sulphur trioxide ($SO_3$) per 1000 cu. ft. of gas will be formed. As the gas cools in the scrubber G or cooling pipes O and mist collector H, the water in the gas will combine with the sulphur trioxide ($SO_3$) forming sulphuric acid of about 92% strength if the gas is cooled to about 167° F.

The strength of the acid condensed may be varied by varying the amount of moisture entering the system at the burner C through manipulation of the damper E. Acid of predetermined strength may be formed in the purification system and iron equipment can be used throughout, while the low aqueous vapor pressure of the condensed acid maintains the gas in a dry condition requiring no further drying before passing into the converter L.

In the foregoing description I have set forth preferred forms of apparatus or equipment and a preferred procedure to be followed in carrying out the invention. However, it is to be understood that the practice of my improved methods is not in any way limited to the use of the particular equipment illustrated or to the procedure described, or to the particular type of catalysts set forth in the Jaeger patents mentioned.

I claim as my invention:—

1. In processes for the manufacture of sulphuric acid by the contact process when burning sulphur-containing ores the step which consists in producing gases by the oxidation of sulphur with a mixture of partly dried air and atmospheric air.

2. In processes for the manufacture of sulphuric acid by the contact process when burning sulphur-containing ores the step which consists in producing gases by the oxidation of sulphur with a variably controlled mixture of partly dried air and atmospheric air.

3. In processes for the manufacture of sulphuric acid of predetermined strength in the purification system, the step which consists in injecting controlled amounts of moisture-laden air admixed with previously dried air in the production of the burner gases by the oxidation of sulphur-containing material.

4. In processes for the manufacture of sulphuric acid by the contact process when burning sulphur-containing ores the step which consists in varying the ratio of dried to moisture-laden air in producing gases by the oxidation of sulphur-containing material for subsequent condensation of acid particles on the impurities in the gases.

5. In processes for the manufacture of sulphuric acid by the contact process when burning sulphur-containing ores the step which consists in varying the ratio of dried to moisture-laden air in producing the hot burner gases by the oxidation of sulphur-containing material to obtain upon condensation an acid of low aqueous vapor pressure.

6. In processes for the manufacture of sulphuric acid by the contact process when burning sulphur-containing ores and using a vanadium catalyst, the steps which consist in producing gases by the oxidation of sulphur-containing material with a variably controlled ratio of dried and moisture-laden air, cooling the gas mixture to condense the acid therein, and thereafter passing the dried gases to a converter containing said catalyst.

CYRIL B. CLARK.